United States Patent
Iwamura et al.

(10) Patent No.: US 11,496,739 B2
(45) Date of Patent: Nov. 8, 2022

(54) ENCODING DEVICE, DECODING DEVICE AND PROGRAM

(71) Applicant: NIPPON HOSO KYOKAI, Tokyo (JP)

(72) Inventors: Shunsuke Iwamura, Tokyo (JP); Shimpei Nemoto, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/655,931

(22) Filed: Mar. 22, 2022

(65) Prior Publication Data

US 2022/0217348 A1 Jul. 7, 2022

Related U.S. Application Data

(63) Continuation of application No. PCT/JP2021/014872, filed on Apr. 8, 2021.

(30) Foreign Application Priority Data

Apr. 8, 2020 (JP) .............................. JP2020-070106

(51) Int. Cl.
*H04N 19/186* (2014.01)
*H04N 19/61* (2014.01)
(Continued)

(52) U.S. Cl.
CPC ......... *H04N 19/126* (2014.11); *H04N 19/176* (2014.11); *H04N 19/186* (2014.11); *H04N 19/61* (2014.11)

(58) Field of Classification Search
CPC .. H04N 19/126; H04N 19/176; H04N 19/186; H04N 19/61
See application file for complete search history.

(56) References Cited

U.S. PATENT DOCUMENTS

| 10,116,937 B2* | 10/2018 | Li | H04N 19/186 |
| 2016/0100168 A1* | 4/2016 | Rapaka | H04N 19/12 |
| | | | 375/240.03 |

(Continued)

OTHER PUBLICATIONS

International Search Report issued in PCT/JP2021/014872; dated Jul. 6, 2021.

(Continued)

*Primary Examiner* — Jessica M Prince
(74) *Attorney, Agent, or Firm* — Studebaker & Brackett PC

(57) ABSTRACT

An encoding device encodes each encoding-target block. The encoding device includes: a predictor configured to generate, for each of the components, a prediction block corresponding to the encoding-target block; a residual generator configured to generate, for each of the components, a prediction residual that represents a difference between the encoding-target block and the prediction block; a color space transformer configured to perform a color space transform process on the prediction residual of each of the components; a transformer configured to generate transform coefficients by performing a transform process on the prediction residual; a quantization controller configured to determine a scaling list to be used in a quantization process on the transform coefficients; and a quantizer configured to perform the quantization process on the transform coefficients by using the determined scaling list, wherein the quantization controller is configured to determine the scaling list, based on the color space transform process.

12 Claims, 7 Drawing Sheets

(51) Int. Cl.
*H04N 19/126* (2014.01)
*H04N 19/176* (2014.01)

(56) References Cited

U.S. PATENT DOCUMENTS

2021/0235101 A1* 7/2021 Sim .................... H04N 19/119
2022/0159301 A1* 5/2022 Zhang ................. H04N 19/124

OTHER PUBLICATIONS

Written Opinion of the International Searching Authority issued in PCT/JP2021/014872; dated Jul. 6, 2021.
Benjamin Bross et al. "Versatile Video Coding (Draft 8)" Joint Video Experts Team (JVET) of ITU-T SG 16 WP 3 and ISO/IEC JTC 1/SC 29/WG 11, 17th Meeting; JVET-Q2001-v8; Jan. 7-17, 2020; pp. 1-497; Brussels, Belgium.
Takeshi Tsukuba et al. "On QP Adjustment for Adaptive Color Transform" Joint Video Experts Team (JVET) of ITU-T SG 16 WP 3 and ISO/IEC JTC 1/SC 29/WG 11, 17th Meeting; JVET-Q0098-v4; Jan. 7-17, 2020; pp. 1-8; Brussels, Belgium.
Adarsh K. Ramasubramonian et al. "AHG15: Scaling Matrices for LFNST-Coded Blocks" Joint Video Experts Team (JVET) of ITU-T SG 16 WP 3 and ISO/IEC JTC 1/SC 29/WG 11, 16th Meeting; JVET-P0365-v2; Oct. 1-11, 2019; pp. 1-5; Geneva, Switzerland.
Shunsuke Iwamura et al. "[AHG15] On Scaling List for JCCR" Joint Video Experts Team (JVET) of ITU-T SG 16 WP 3 and ISO/IEC JTC 1/SC 29/WG 11, 16th Meeting; JVET-P0608; Oct. 1-11, 2019; pp. 1-6; Geneva, Switzerland.
Shunsuke Iwamura et al. "Scaling List for Adaptive Colour Transform" Joint Video Experts Team (JVET) of ITU-T SG 16 WP 3 and ISO/IEC JTC 1/SC 29/WG 11, 18th Meeting; JVET-R0380-v4; Apr. 15-24, 2020; pp. 1-8; teleconference.

* cited by examiner

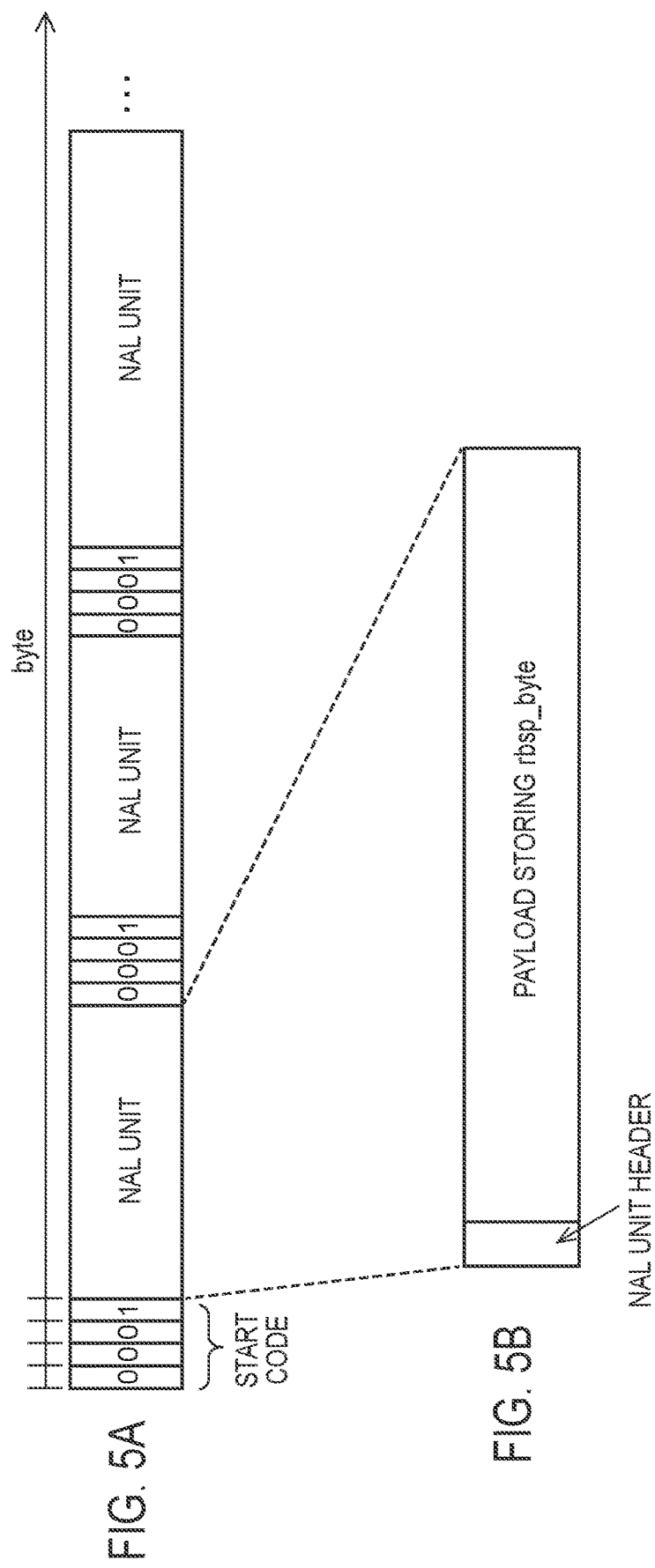

FIG. 6

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp() | VCL |
| 1 | STSA_NUT | Coded slice of an STSA picture slice_layer_rbsp() | VCL |
| 2 | RADL_NUT | Coded slice of a RADL picture slice_layer_rbsp() | VCL |
| 3 | RASL_NUT | Coded slice of a RASL picture slice_layer_rbsp() | VCL |
| 4..6 | RSV_VCL_4.. RSV_VCL_6 | Reserved non-IRAP VCL NAL unit types | VCL |
| 7<br>8 | IDR_W_RADL<br>IDR_N_LP | Coded slice of an IDR picture slice_layer_rbsp( ) | VCL |
| 9 | CRA_NUT | Coded slice of a CRA picture slice_layer_rbsp( ) | VCL |
| 10 | GDR_NUT | Coded slice of a GDR picture slice_layer_rbsp( ) | VCL |
| 11<br>12 | RSV_IRAP_11<br>RSV_IRAP_12 | Reserved IRAP VCL NAL unit types | VCL |
| 13 | DCI_NUT | Decoding capability information decoding_capability_infomation_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23<br>24 | PREFIX_SEI_NUT<br>SUFFIX_SEI_NUT | Supplemental enhancement infomation sei_rbsp( ) | non-VCL |
| 25 | FD_NUT | Filler data filler_data_rbsp( ) | non-VCL |
| 26<br>27 | RSV_NVCL_26<br>RSV_NVCL_27 | Reserved non-VCL NAL unit types | non-VCL |
| 28..31 | UNSPEC_28.. UNSPEC_31 | Unspecified non-VCL NAL unit types | non-VCL |

ENCODING DEVICE, DECODING DEVICE AND PROGRAM

RELATED APPLICATIONS

The present application is a continuation based on PCT Application No. PCT/JP2021/014872, filed on Apr. 8, 2021, which claims the benefit of Japanese Patent Application No. 2020-070106 filed on Apr. 8, 2020. The content of which is incorporated by reference herein in their entirety.

TECHNICAL FIELD

The present invention relates to an encoding device, a decoding device, and a program.

BACKGROUND ART

In a VVC specification draft, a technique called adaptive color transform (ACT) is adopted. In the technique, when the chroma format of an input video is 4:4:4, after acquisition of prediction residuals, which are differences between an encoding-target block obtained by dividing an original image and a prediction block obtained by predicting the encoding-target block, a color space (RGB space) of the prediction residuals is transformed into a YCgCo space, and encoding processes including a transform process, an entropy encoding process, and the like are performed on the prediction residuals after the color space transformation (see Non Patent Literature 1).

An encoding device can control, for each encoding-target block, whether or not ACT is applied, and outputs an ACT application flag for each encoding-target block in a stream. Accordingly, due to ACT, encoding-target blocks for which the transform process and the quantization process are applied to prediction residuals in the RGB space, and encoding-target blocks for which the transform process and the quantization process are applied after prediction residuals are transformed from the RGB space into the YCgCo space coexist in an entire image (picture).

Incidentally, VVC introduces a scaling list (also referred to as quantization matrix) that controls a quantization step for each frequency component, in quantization of transform coefficients obtained by performing the transform process on prediction residuals. A scaling list can be individually set for each of three color components (for example, luminance component, first chrominance component, and second chrominance component) included in an input video signal, and the encoding device signals, to the decoding side, information indicating whether or not a scaling list is applied and, when a scaling list is applied, what scaling list is applied.

CITATION LIST

Non Patent Literature

Non Patent Literature 1: JVET-Q2001 "Versatile Video Coding (Draft 8)"

DISCLOSURE OF INVENTION

An encoding device according to a first feature encodes each encoding-target block generated by dividing an image that includes three or more components including a first component, a second component, and a third component. The encoding device includes: a predictor configured to generate, for each of the components, a prediction block corresponding to the encoding-target block; a residual generator configured to generate, for each of the components, a prediction residual that represents a difference between the encoding-target block and the prediction block; a color space transformer configured to perform a color space transform process on the prediction residual of each of the components; a transformer configured to generate transform coefficients by performing a transform process on the prediction residual; a quantization controller configured to determine a scaling list to be used in a quantization process on the transform coefficients; and a quantizer configured to perform the quantization process on the transform coefficients by using the determined scaling list, wherein the quantization controller is configured to determine the scaling list, based on the color space transform process.

A decoding device according to a second feature decodes each decoding-target block generated by dividing an image that includes three or more components including a first component, a second component, and a third component. The decoding device includes: an entropy decoder configured to decode, for each of the components, quantized transform coefficients in the decoding-target block from a bit stream; a predictor configured to generate, for each of the components, a prediction block corresponding to the decoding-target block; an inverse quantization controller configured to determine a scaling list to be used in an inverse transform process for transform coefficients; an inverse quantizer configured to generate the transform coefficients by performing the inverse quantization process on the quantized transform coefficients; an inverse transformer configured to generate a prediction residual by performing the inverse transform process on the transform coefficients by using the determined scaling list; a color space inverse transformer configured to perform a color space inverse transform process on the prediction residual; and a combiner configured to generate a decoded block by combining the prediction residual and the prediction block, wherein the inverse quantization controller is configured to determine the scaling list, based on the color space inverse transform process.

A program according to a third feature causes a computer to function as the encoding device according to the first feature.

A program according to a fourth feature causes a computer to function as the decoding device according to the second feature.

BRIEF DESCRIPTION OF DRAWINGS

FIG. 5A is a diagram illustrating a bit stream outputted by an entropy encoder.

FIG. 5B is a diagram illustrating a bit stream outputted by an entropy encoder.

FIG. 6 is a diagram illustrating types of NAL unit.

DESCRIPTION OF EMBODIMENTS

With ACT, it is possible to control, for each encoding-target block, whether or not color space transformation of prediction residuals is performed. Accordingly, when an input video that is an RGB video is encoded, one of two adjacent encoding-target blocks can be an encoding-target block to which ACT is applied, and the other can be an encoding-target block to which ACT is not applied.

As indicated in Table 1, with respect to an encoding-target block to which ACT is applied, after prediction residuals are transformed from the RGB space into the YCgCo space, a first scaling list is applied to prediction residuals of Y component, a second scaling list is applied to prediction residuals of Cg component, and a third scaling list is applied to prediction residuals of Co component. On the other hand, with respect to an encoding-target block to which ACT is not applied, prediction residuals remain in the RGB space, and the first scaling list is applied to prediction residuals of R component, the second scaling list is applied to prediction residuals of G component, and the third scaling list is applied to prediction residuals of B component.

TABLE 1

|  | RGB space (ACT not applied) | YCgCo space (ACT applied) | Scaling list |
| --- | --- | --- | --- |
| First component | R component | Y component | First scaling list |
| Second component | G component | Cg component | Second scaling list |
| Third component | B component | Co component | Third scaling list |

In general, it is known that many of luminance components in the RGB space are concentrated in the G component, and scaling lists used for a video in the RGB space are designed on the premise that a luminance signal is included mainly in the G component. Since it is known that a luminance signal includes many higher frequency components compared to a chrominance signal, a scaling list designed such as to be applied to a luminance signal is likely to differ in nature from a scaling list designed such as to be applied to a chrominance signal.

However, as a result of ACT being applied to prediction residuals, the first scaling list designed for the R component that does not include much of a luminance signal is applied to the Y component after ACT-based transformation. Accordingly, the scaling list that is originally designed for a component with different nature is applied, so that visual deterioration may be caused.

Hence, an object of the present disclosure is to restrain deterioration in image quality also when ACT is applied.

An encoding device and a decoding device according to an embodiment are described with reference to the accompanying drawings. The encoding device and the decoding device according to the embodiment encode and decode videos such as MPEG (Moving Picture Experts Group) videos. In the description of the drawings below, the same or similar reference signs are used for the same or similar parts.

<Encoding Device>

Figure 1:
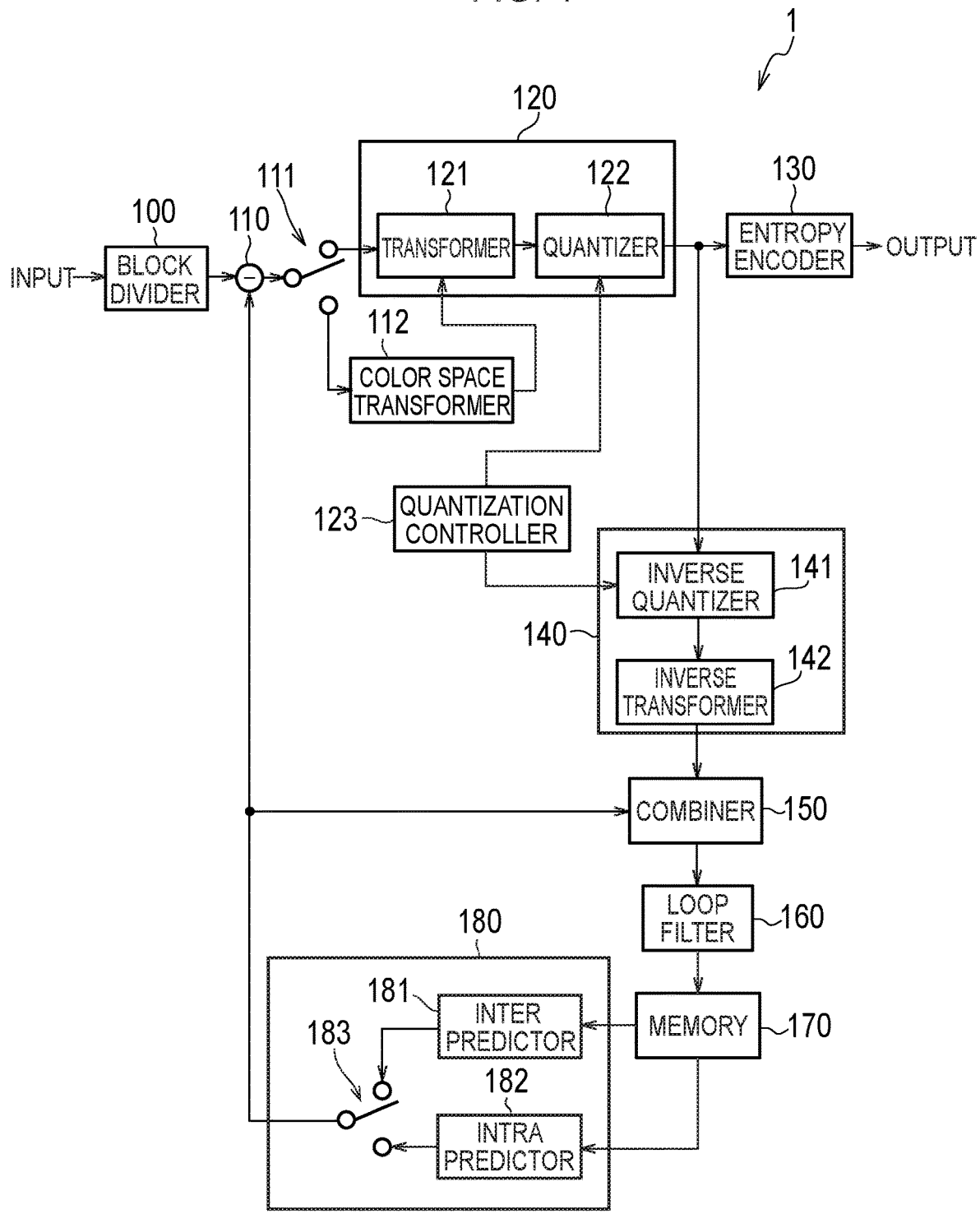
FIG. 1 is a diagram illustrating the configuration of an encoding device according to an embodiment.

A configuration of an encoding device according to the present embodiment will be described first. FIG. 1 is a diagram illustrating a configuration of an encoding device 1 according to the present embodiment.

As illustrated in FIG. 1, the encoding device 1 includes a block divider 100, a residual generator 110, a switcher 111, a color space transformer 112, a transformer/quantizer 120, a quantization controller 123, an entropy encoder 130, an inverse quantizer/inverse transformer 140, a combiner 150, a loop filter 160, a memory 170, and a predictor 180.

The block divider 100 divides an original image which is an input image in frame (or picture) units that constitutes a video into a plurality of image blocks and outputs the image blocks obtained by division to the residual generator 110. The size of the image blocks may be 32×32 pixels, 16×16 pixels, 8×8 pixels, or 4×4 pixels. The shape of the image blocks is not limited to square and may be rectangular (non-square). The image block is a unit (encoding-target block) in which the encoding device 1 performs encoding and is a unit (decoding-target block) in which a decoding device performs decoding. Such an image block is sometimes referred to as a CU (Coding Unit).

In the present embodiment, a description is given mainly of a case where an input image is of an RGB signal, with a chroma format of 4:4:4. The "R" component corresponds to a first component, the "G" component corresponds to a second component, and the "B" component corresponds to a third component. The block divider 100 outputs blocks by performing division into blocks with respect to each of the R component, the G component, and the B component included in an image. In the description of the encoding device below, when the components are not distinguished from each other, each encoding-target block is simply referred to as encoding-target block.

The residual generator 110 calculates prediction residuals that represent differences (errors) between an encoding-target block outputted by the block divider 100 and a prediction block obtained by the predictor 180 predicting the encoding-target block. More specifically, the residual generator 110 calculates the prediction residuals by subtracting each pixel value of the prediction block from each pixel value of the encoding-target block, and outputs the calculated prediction residuals to the switcher 111. In the present embodiment, the residual generator 110 generates the prediction residuals of each component, based on differences between the encoding-target block of each component and the prediction block of each component.

The switcher 111 outputs the prediction residuals of each component outputted by the residual generator 110, to any one of the transformer/quantizer 120 and the color space transformer 112. The switcher 111 outputs the prediction residuals to the transformer/quantizer 120 when a color space transform process (ACT) is not performed, and outputs the prediction residuals to the color space transformer 112 when the color space transform process is performed.

The color space transformer 112 performs the color space transform process on the prediction residuals of each component and outputs prediction residuals after the color space transform process to the transformer/quantizer 120. The color space transformer 112 generates the new prediction residuals by performing transform calculation as follows, with respect to the R component, the G component, and the B component of the prediction residuals in the encoding-target block.

$$Co = R - B$$
$$t = B + (Co \gg 1)$$
$$Cg = G - t$$

$$Y = t + (Cg \gg 1)$$

In the above, ">>" represents an arithmetic right shift. Moreover, the "Y" component corresponds to the first component, the "Gg" component corresponds to the second component, and the "Co" component corresponds to the third component.

The color space transformer 112 can control, for each encoding-target block, whether or not the color space transform process is performed. The entropy encoder 130 signals, in a bit stream, a flag indicating whether or not the color space transform process is performed on a current encoding-target block.

Note that in the color space transform process by the color space transformer 112, the prediction residuals formed of the new components may be generated by performing addition, subtraction, multiplication, division, a shift process, or the like on each original component, and color space transformation does not necessarily need to be performed. The color space transform process does not need to be transformation that affects all of the components. For example, the color space transformer 112 may apply such a color space transform process that maintains the first component without changing, uses a mean value of the second component and the third component for the new second component, and uses a difference between the second component and the third component for the new third component.

The transformer/quantizer 120 executes a transform process and a quantization process on each of blocks. The transformer/quantizer 120 includes a transformer 121 and a quantizer 122.

The transformer 121 calculates transform coefficients by performing the transform process on the prediction residuals (referred to as prediction residuals, regardless of whether or not the color space transform process is applied) outputted by the switcher 111 or the color space transformer 112, and outputs the calculated transform coefficients to the quantizer 122. More specifically, the transformer 121 generates the transform coefficients for each component by performing the transform process on the prediction residuals on a block basis. The transform process may be frequency transformation such as discrete cosine transform (DCT), discrete sine transform (DST), and/or discrete wavelet transform. In addition, the transformer 121 outputs information related to the transform process to the entropy encoder 130.

The transform process includes transform skip in which no transform process is performed, and which is adopted in HEVC (High Efficiency Video Codec) and the VVC (Versatile Video Coding) specification draft. In a transform skip mode in HEVC, transform coefficients are obtained by scaling prediction residuals, without performing the horizontal or vertical transform process. However, the transform skip according to the present embodiment also includes transformation in which the transform process is only horizontally applied, and transformation in which the transform process is only vertically applied. Moreover, the transformer 121 may perform a secondary transform process in which a transform process is further applied to the transform coefficients obtained through the transform process. The secondary transform process may be applied only to a partial area of the transform coefficients.

The quantization controller 123 determines a scaling list (quantization matrix) to be used in a quantization process on the transform coefficients generated by the transformer 121. Here, as a scaling list, a uniform scaling list (a flat scaling list) in which all elements of the scaling list have equal values (for example, the values of all elements are 16) is defined beforehand. The quantization controller 123 can set a plurality of non-uniform scaling lists in which each element is set at a different value. Note that in a case where a scaling list to be used on a block with a large size is defined with a small size and is enlarged when the scaling list is actually used, different values are not necessarily set for all elements. The entropy encoder 130 outputs, in a stream, information indicating which scaling list is used to perform the quantization process. Note that each non-uniform scaling list is also a scaling list in which at least partially different values can be set as the values of the elements of the scaling list, that is, a variable scaling list.

In the present embodiment, the quantization controller 123 determines a scaling list, based on whether or not the color space transformer 112 performs the color space transform process. More specifically, in a case where it is set to use the non-uniform scaling list in which the values of the elements of the scaling list are at least partially different, the quantization controller 123 determines whether the non-uniform scaling list is used or the uniform scaling list is used, based on whether or not the color space transformer 112 performs the color space transform process (that is, whether the switcher 111 outputs the prediction residuals to the color space transformer 112).

For example, when the color space transformer 112 does not perform the color space transform process, the quantization controller 123 determines the non-uniform scaling list as the scaling list to be used by the quantizer 122 in the quantization process. When the color space transformer 112 performs the color space transform process, the quantization controller 123 determines the uniform scaling list as the scaling list to be used by the quantizer 122 in the quantization process.

Here, since a non-uniform scaling list is set for each color component, the non-uniform scaling lists differ in nature, according to the respective target components. Accordingly, when an encoding-target block to which ACT is applied and an encoding-target block to which ACT is not applied coexist in one image (picture), application of the non-uniform scaling list causes deterioration in image quality. In the present embodiment, when the color space transformer 112 performs the color space transform process (that is, when ACT is applied), the uniform scaling list is used, whereby deterioration in image quality can be restrained.

The quantizer 122 quantizes the transform coefficients outputted from the transformer 121 by using a quantization parameter and the scaling list, and outputs the quantized transform coefficients to the entropy encoder 130 and the inverse quantizer/inverse transformer 140. Here, the scaling list used by the quantizer 122 in the quantization process is determined by the quantization controller 123. Moreover, the quantizer 122 outputs information related to the quantization process (specifically, information on the quantization parameter and the scaling list used in the quantization process) to the entropy encoder 130 and the inverse quantizer 141.

The quantization parameter is a parameter for which one value is set for one block. Specifically, the quantization parameter is a parameter that is applied in common to each transform coefficient in a block, and is a parameter that determines quantization granularity (step size).

A scaling list constitutes a matrix (quantization matrix) including values that are set for each component in one block. More specifically, a scaling list includes values (weighted coefficients) that are set for each component including i×j elements depending on a block size, and is used to adjust quantization granularity for each of components ranging from low to high frequencies of the transform coefficients. With respect to a non-uniform scaling list, the entropy encoder 130 signals to the decoding side.

The entropy encoder 130 performs entropy encoding on the quantized transform coefficients outputted by the quantizer 122, generates a bit stream (encoded data) by performing data compression, and outputs the bit stream to the decoding side. For the entropy encoding, Huffman coding and/or CABAC (Context-based Adaptive Binary Arithmetic Coding) or the like can be used. Moreover, the entropy encoder 130 adds information related to the transform process inputted from the transformer 121 into the bit stream and signals to the decoding side, and adds information related to a prediction process inputted from the predictor 180 into the bit stream and signals to the decoding side. Further, the entropy encoder 130 adds a color space transform flag indicating whether or not ACT is applied, for each encoding-target block, into the bit stream and signals to the decoding side.

The inverse quantizer/inverse transformer 140 executes an inverse quantization process and an inverse transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the quantized transform coefficients outputted by the quantizer 122 by using the quantization parameter (Qp) and the scaling list to restore the transform coefficients, and outputs the restored transform coefficients to the inverse transformer 142. Here, the scaling list used by the inverse quantizer 141 in the inverse quantization process is determined by the quantization controller 123.

The inverse transformer 142 performs the inverse transform process corresponding to the transform process performed by the transformer 121 based on transform type information outputted from the transformer 121. For example, when the transformer 121 performs the discrete cosine transform, the inverse transformer 142 performs inverse discrete cosine transform. The inverse transformer 142 restores the prediction residual by performing the inverse transform process on the transform coefficients outputted from the inverse quantizer 141, and outputs a restoration prediction residual that is the restored prediction residual to the combiner 150.

The combiner 150 combines the restoration prediction residual outputted from the inverse transformer 142 with a prediction block outputted from the predictor 180 in pixel units. The combiner 150 decodes (reconstructs) an encoding-target block by adding individual pixel values of the restoration prediction residual to individual pixel values of the prediction block, and outputs a decoded block to the loop filter 160. The decoded block is sometimes referred to as a reconstructed block.

The loop filter 160 performs a filter process on the decoded block outputted from the combiner 150 and outputs the decoded block after the filter process to the memory 170.

The memory 170 stores the decoded block after the filter process outputted from the loop filter 160 and accumulates the decoded block as decoded images in frame units. The memory 170 outputs the stored decoded block or decoded images to the predictor 180.

The predictor 180 performs the prediction process in units of the block. The predictor 180 generates a prediction block for each component by performing prediction processes such as intra prediction and inter prediction on each encoding-target block. The predictor 180 according to the present embodiment includes an inter predictor 181, an intra predictor 182, and a switcher 183.

The inter predictor 181 performs inter prediction utilizing an inter-frame correlation. Specifically, the inter predictor 181 calculates a motion vector through a scheme such as block matching by using the decoded image stored in the memory 170 as a reference image, generates an inter prediction block by predicting the encoding-target block, and outputs the generated inter prediction block to the switcher 183. Here, the inter predictor 181 selects an optimal inter prediction method from inter prediction using a plurality of reference images (typically, bi-prediction), inter prediction using one reference image (uni-directional prediction), and performs the inter prediction by using the selected inter prediction method. The inter predictor 181 outputs information regarding the inter prediction (the motion vector and the like) to the entropy encoder 130.

The intra predictor 182 performs intra prediction utilizing an intra-frame spatial correlation. Specifically, the intra predictor 182 generates an intra prediction block by referring to decoded pixels present around the encoding-target block of the decoded image stored in the memory 170, and outputs the generated intra prediction block to the switcher 183. The intra predictor 182 selects an intra prediction mode to be applied to the encoding-target block from among a plurality of intra prediction modes, and predicts the encoding-target block by using the selected intra prediction mode.

The switcher 183 switches the inter prediction block outputted from the inter predictor 181 and the intra prediction block outputted from the intra predictor 182 and outputs one of the prediction blocks to the residual generator 110 and the combiner 150.

As described above, the encoding device 1 according to the present embodiment encodes each encoding-target block that is generated by dividing an image that includes three or more components including the first component, the second component, and the third component. The encoding device 1 includes: the predictor 180 configured to generate, for each of the components, a prediction block corresponding to an encoding-target block; the residual generator 110 configured to generate, for each of the components, a prediction residual that represents a difference between the encoding-target block and the prediction block; the color space transformer configured to perform the color space transform process on the prediction residual; the transformer 121 configured to generate transform coefficients by performing the transform process on the prediction residual; the quantization controller 123 configured to determine a scaling list to be used in the quantization process on the transform coefficients; and the quantizer 122 configured to perform the quantization process on the transform coefficients by using the determined scaling list.

Figure 2:
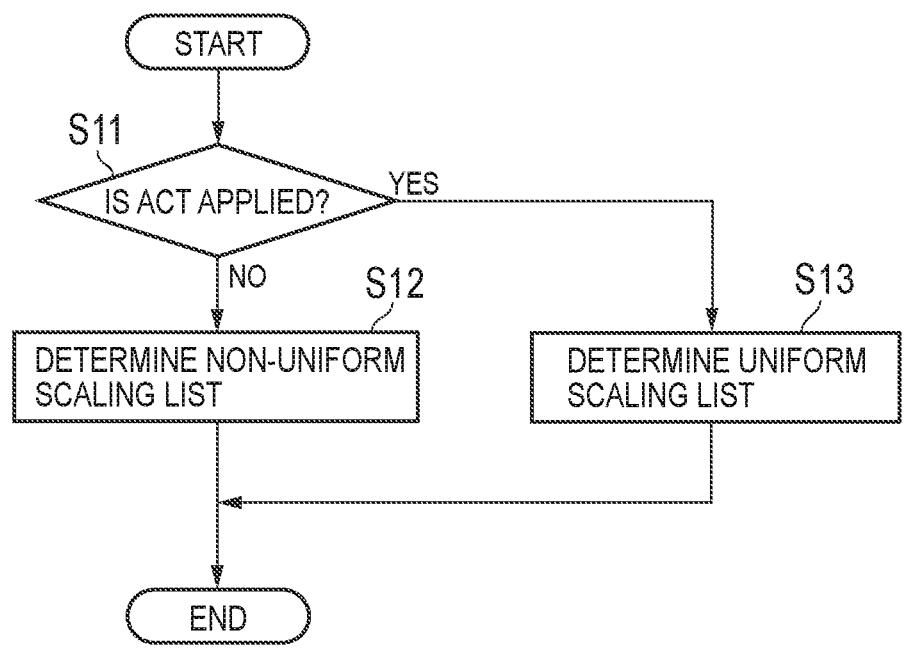
FIG. 2 is a diagram illustrating operation of a quantization controller and an inverse quantization controller according to the embodiment.

Next, operation of the quantization controller 123 according to the present embodiment is described. FIG. 2 is a diagram illustrating the operation of the quantization controller 123 according to the present embodiment. The quantization controller 123 performs the operation in FIG. 2 on each encoding-target block. Note that the operation in FIG. 2 is operation based on the premise that it is set to use the non-uniform scaling list, based on a factor other than ACT (color space transform process).

As illustrated in FIG. 2, in step S11, the quantization controller 123 determines whether or not ACT (color space transform process) is applied to an encoding-target block.

When ACT is not applied to the encoding-target block (step S11: NO), in step S12, the quantization controller 123 determines the non-uniform scaling list as the scaling list to be used in the transform process on the encoding-target block. The non-uniform scaling list may be one designed suitably for a characteristic of each component in the RGB space. For example, the non-uniform scaling list may be one designed on the premise that a luminance signal is included mainly in the G component. For example, the quantization controller 123 applies the non-uniform first scaling list to prediction residuals of the R component, applies the non-uniform second scaling list to prediction residuals of the G component, and applies the non-uniform third scaling list to prediction residuals of the B component.

When ACT is applied to the encoding-target block (step S11: YES), in step S13, the quantization controller 123 determines the uniform scaling list as the scaling list to be used in the transform process on the encoding-target block. The uniform scaling list is a preset scaling list, that is, a scaling list shared between the encoding side and the decoding side beforehand. For example, the quantization controller 123 applies the uniform scaling list to each of prediction residuals of the Y component, prediction residuals of the Cg component, and prediction residuals of the Co component.

As described above, the encoding device 1 according to the present embodiment uses the uniform scaling list when ACT is applied. Thus, deterioration in image quality can be restrained even if an encoding-target block to which ACT is applied and an encoding-target block to which ACT is not applied coexist in one image (picture).

<Decoding Device>

Figure 3:
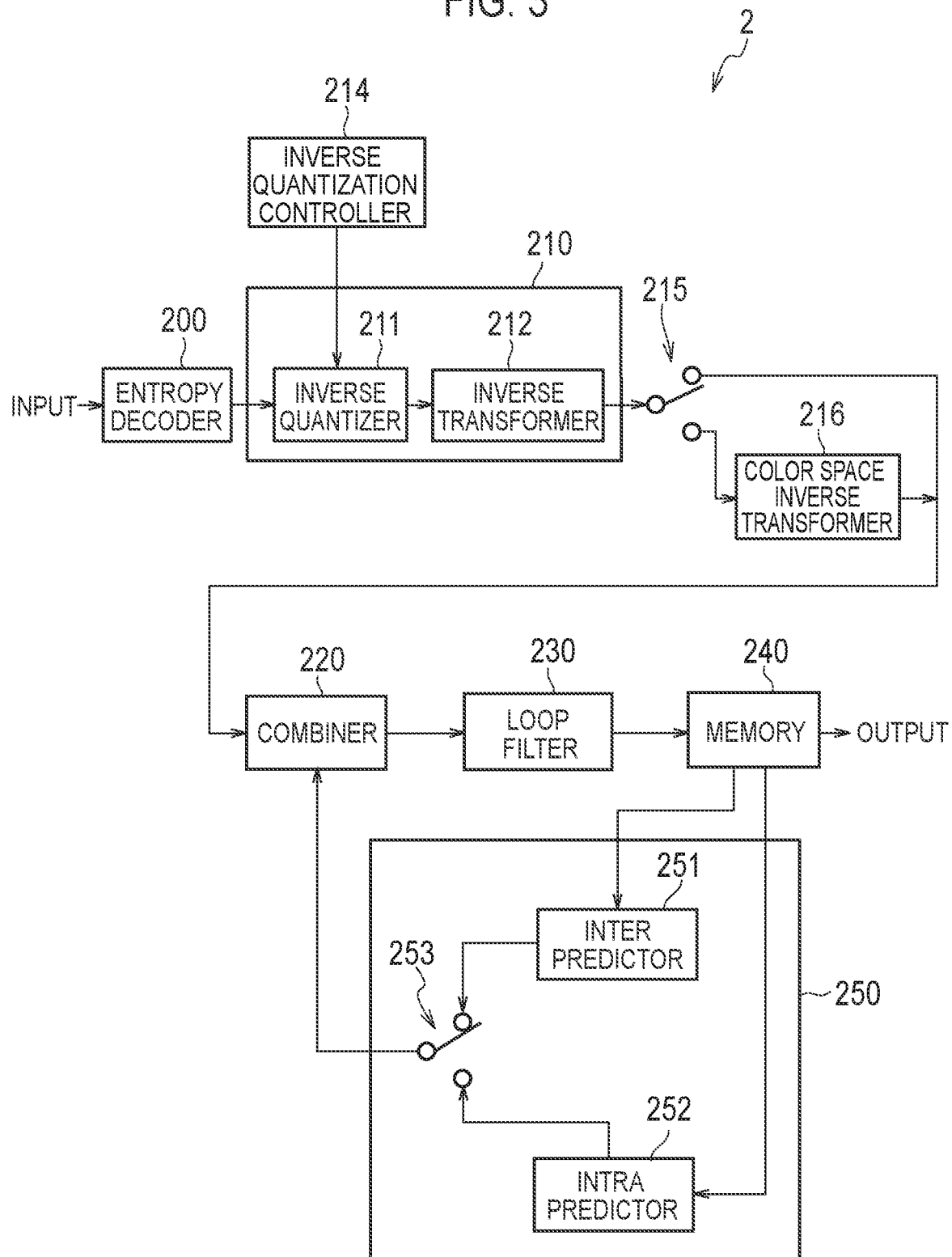
FIG. 3 is a diagram illustrating a configuration of a decoding device according to the embodiment.

Next, a decoding device according to the present embodiment is described, focusing mainly on differences from the encoding device 1. FIG. 3 is a diagram illustrating a configuration of the decoding device 2 according to the present embodiment.

As illustrated in FIG. 3, the decoding device 2 includes an entropy decoder 200, an inverse quantizer/inverse transformer 210, an inverse quantization controller 214, a switcher 215, a color space inverse transformer 216, a combiner 220, a loop filter 230, a memory 240, and a predictor 250.

The entropy decoder 200 decodes encoded data (bit stream) and outputs quantized transform coefficients corresponding to a decoding-target block to the inverse quantizer/inverse transformer 210. Moreover, the entropy decoder 200 acquires information related to a transform process and a quantization process and outputs the information related to the transform process and the quantization process to the inverse quantizer/inverse transformer 210. Further, the entropy decoder 200 acquires information related to a prediction process and outputs the information related to the prediction process to the predictor 250. The entropy decoder 200 acquires a color space transform flag for each encoding-target block, and outputs the acquired color space transform flag to the inverse quantization controller 214 and the switcher 215.

The inverse quantization controller 214 performs operation similar to the operation of the quantization controller 123 of the encoding device 1, based on the color space transform flag (see FIG. 2).

The inverse quantizer/inverse transformer 210 executes an inverse quantization process and an inverse transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the encoding device 1. The inverse quantizer 211 inverse quantizes the quantized transform coefficients outputted by the entropy decoder 200, by using a quantization parameter (Qp) and a scaling list to restore transform coefficients in the decoding-target block, and outputs the restored transform coefficients to the inverse transformer 212. Here, the scaling list used in the inverse quantization process by the inverse quantizer 211 is determined by the inverse quantization controller 214.

The inverse transformer 212 performs the inverse transform process corresponding to the transform process performed by the transformer 121 of the encoding device 1. The inverse transformer 212 restores prediction residuals by performing the inverse transform process on the transform coefficients outputted by the inverse quantizer 211, and outputs the restored prediction residuals (restoration prediction residuals) to the switcher 215.

The switcher 215 outputs the prediction residuals of each component outputted by the inverse transformer 212, to any one of the combiner 220 and the color space inverse transformer 216 based on the color space transform flag. The switcher 215 outputs the prediction residuals to the combiner 220 when a color space inverse transform process (ACT) is not performed, and outputs the prediction residuals to the color space inverse transformer 216 when the color space inverse transform process is performed.

The color space inverse transformer 216 performs the color space inverse transform process that is an inverse process of the color space transform process performed by the color space transformer 112 of the encoding device 1, and outputs prediction residuals after the color space inverse transform process to the combiner 220. More specifically, by using the Y component, the Cg component, and the Co component of the restoration prediction residuals, inverse transform calculation is performed as follows.

$$t = Y - (Cg \gg 1)$$
$$G = Cg + t$$
$$B = t - (Co \gg 1)$$
$$R = Co + B$$

The combiner 220 decodes (reconstructs) an original block by combining the prediction residuals outputted by the switcher 215 or the color space inverse transformer 216 and a prediction block outputted by the predictor 250 on a pixel-by-pixel basis, and outputs the decoded block to the loop filter 230.

The loop filter 230 performs a filter process on the decoded block outputted by the combiner 220, and outputs the decoded block after the filter process to the memory 240.

The memory 240 stores each decoded block outputted by the combiner 220 and accumulates the decoded blocks as a decoded image in a unit of the frame. The memory 240 outputs the decoded blocks or the decoded image to the predictor 250. Moreover, the memory 240 outputs decoded images in units of the frame to an outside of the decoding device 2.

The predictor 250 performs prediction for each component in units of the block. The predictor 250 includes an inter predictor 251, an intra predictor 252, and a switcher 253.

The inter predictor 251 performs inter prediction that utilizes correlation between frames. Specifically, the inter predictor 251 generates an inter prediction block by predicting an encoding-target block by using a decoded image stored in the memory 240 for a reference image, based on information related to inter prediction (for example, motion vector information) outputted by the entropy decoder 200, and outputs the generated inter prediction block to the switcher 253.

The intra predictor 252 performs intra prediction that utilizes spatial correlation within a frame. Specifically, the intra predictor 252 generates an intra prediction block by referring to decoded pixels around an encoding-target block in a decoded image stored in the memory 240, by using an intra prediction mode corresponding to information related to intra prediction (for example, intra prediction mode information) outputted by the entropy decoder 200, and outputs the generated intra prediction block to the switcher 253.

The switcher 253 switches between the inter prediction block outputted by the inter predictor 251 and the intra prediction block outputted by the intra predictor 252, and outputs one of the prediction blocks to the combiner 220.

As described above, the decoding device 2 according to the present embodiment decodes each decoding-target block that is generated by dividing an image that includes three or more components including the first component, the second component, and the third component. The decoding device 2 includes: the entropy decoder 200 configured to decode, for each of the components, quantized transform coefficients in a decoding-target block from a bit stream; the predictor 250 configured to generate, for each of the components, a prediction block corresponding to the decoding-target block; the inverse quantization controller 214 configured to determine a scaling list to be used in the inverse transform process for transform coefficients; the inverse quantizer 211 configured to generate the transform coefficients by performing the inverse transform process on the quantized transform coefficients; the inverse transformer 212 configured to generate a prediction residual by performing the inverse transform process on the transform coefficients by using the determined scaling list; the color space inverse transformer 216 configured to perform the color space inverse transform process on the prediction residual; and the combiner 220 configured to generate a decoded block by combining the prediction residual and the prediction block.

The inverse quantization controller 214 determines a scaling list, based on the color space inverse transform process (color space transform flag). In the present embodiment, in a case where it is set by the encoding side to use the non-uniform scaling list, the inverse quantization controller 214 determines whether the non-uniform scaling list is used, or the uniform scaling list, based on whether or not the color space inverse transformer 216 performs the color space inverse transform process.

For example, in the case where it is set by the encoding side to use the non-uniform scaling list, the inverse quantization controller 214 determines the non-uniform scaling list as the scaling list to be used in the inverse quantization process when the color space inverse transformer 216 does not perform the color space inverse transform process. When the color space inverse transformer 216 performs the color space inverse transform process, the inverse quantization controller 214 determines the uniform scaling list as the scaling list to be used in the inverse quantization process.

As described above, the decoding device 2 according to the present embodiment uses the uniform scaling list when ACT is applied. Thus, deterioration in image quality can be restrained even if an encoding-target block to which ACT is applied and an encoding-target block to which ACT is not applied coexist in one image (picture).

Modification

Next, a modification of the embodiment is described, focusing mainly on differences from the embodiment.

In the present modification, in a case where it is set by the encoding device 1 to use the non-uniform scaling list, the non-uniform scaling list is used even if ACT (color space transform process) is applied. However, the quantization controller 123 of the encoding device 1 changes correspondences between the three or more components included in an image and the respective scaling lists for the components, based on whether or not ACT is applied.

Figure 4:
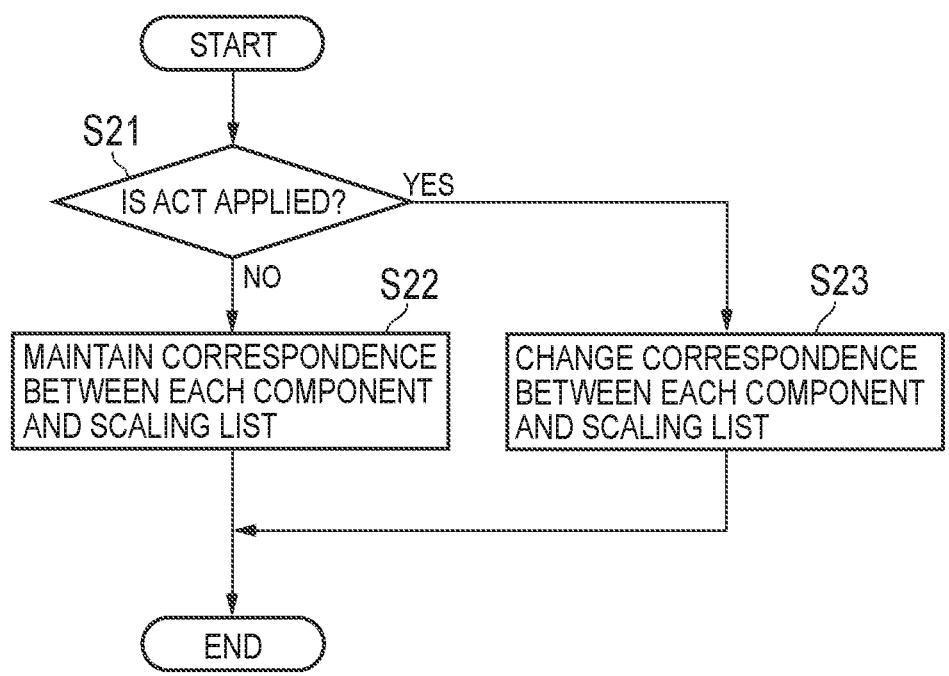
FIG. 4 is a diagram illustrating operation of the quantization controller and the inverse quantization controller according to a modification.

FIG. 4 is a diagram illustrating operation of the quantization controller 123 according to the present modification.

As illustrated in FIG. 4, when the color space transform process is not performed (step S21: NO), in step S22, the quantization controller 123 of the encoding device 1 determines the first scaling list for the R component that is the first component, the second scaling list for the G component that is the second component, and the third scaling list for the B component that is the third component (see Table 2).

TABLE 2

| | RGB space (ACT not applied) | Scaling list |
|---|---|---|
| First component | R component | First scaling list |
| Second component | G component | Second scaling list |
| Third component | B component | Third scaling list |

When the color space transformer performs the color space transform process (step S21: YES), in step S23, the correspondences are changed such that the second scaling list is determined for the Y component that is the first component (see Table 3).

TABLE 3

| | YCgCo space (ACT applied) | Scaling list |
|---|---|---|
| First component | Y component | Second scaling list |
| Second component | Cg component | Third scaling list |
| Third component | Co component | First scaling list |

Since many of luminance components in the RGB space are concentrated in the G component, the second scaling list for the G component is applied to the Y component. Thus, since the appropriate scaling list can be applied to the Y component, deterioration in image quality can be restrained. Note that in the example in Table 3, the correspondences are changed such that the third scaling list is determined for the Cg component that is the second component, and the first scaling list is determined for the Co component that is the third component.

Similarly, in the case where it is set by the encoding device 1 to use the non-uniform scaling list, the inverse quantization controller 214 of the decoding device 2 changes correspondences between the three or more components included in an image and the respective scaling lists for the components, based on whether or not ACT is applied (that is, the color space inverse transformer 216 performs the color space inverse transform process).

When the color space inverse transformer 216 does not perform the color space inverse transform process, the inverse quantization controller 214 determines the first scaling list for the R component that is the first component, the second scaling list for the G component that is the second component, and the third scaling list for the B component that is the third component (see Table 2). When the color space inverse transformer 216 performs the color space inverse transform process, the inverse quantization controller 214 determines the second scaling list for the Y component that is the first component (see Table 3).

Note that in the present modification, when the correspondences between the components and the scaling lists are changed, it is assumed that the changed correspondences (that is, the correspondences between the Y component, the Cg component, the Co component and the first to third scaling lists) are fixed (see Table 3). However, such correspondences may be configured to be variable by signaling the correspondences from the encoding device 1 (entropy encoder 130) to the decoding device 2. For example, the encoding device 1 (entropy encoder 130) may signal information indicating the changed correspondences (that is, the correspondences between the Y component, the Cg component, the Co component and the first to third scaling lists) by adding the information into an adaptation parameter set (APS), which will be described later.

OTHER EMBODIMENTS

The entropy encoder 130 of the encoding device 1 may output a sequence parameter set (SPS) or an adaptation parameter set (APS) that includes information (control flag) indicating whether or not operation of determining a scaling list based on the color space transform process is performed. The entropy decoder 200 of the decoding device 2 may acquire the SPS or the APS including the information indicating whether or not operation of determining a scaling list based on the color space inverse transform process is performed.

Moreover, the entropy encoder 130 of the encoding device 1 may output an SPS or an APS including information (control flag) indicating which one of the operation of determining a scaling list according to the embodiment and the operation of determining a scaling list according to the modification 1 is used. The entropy decoder 200 of the decoding device 2 may acquire the SPS or the APS including the information indicating which one of the operation of determining a scaling list according to the embodiment and the operation of determining a scaling list according to the modification 1 is used. The entropy encoder 130 of the encoding device 1 may be configured to signal the control flag, depending on whether or not the chroma format is 4:4:4, or may be configured to control signaling of the control flag, depending on applicability of ACT to a sequence, which is indicated in an SPS or the like. More specifically, a configuration may be made such that the control flag is signaled only when a flag indicating that ACT can be applied to an encoding-target sequence is signaled in an SPS. Moreover, a configuration may be made such that signaling of the control flag is controlled depending on a flag in an APS indicating whether or not a scaling list for a chrominance signal is included in the APS. More specifically, the control flag may be configured to be signaled only when a scaling list for a chrominance signal is included in an APS.

FIG. 5A and FIG. 5B are diagrams illustrating a bit stream outputted by the entropy encoder 130.

As illustrated in FIG. 5A, a bit stream includes a plurality of NAL units and start codes provided at a head of each NAL unit. The start code has 4 bytes and is controlled such that the 0001 (=0×00000001) is not generated in the NAL unit. As illustrated in FIG. 5B, each NAL unit includes a NAL unit header and a payload.

FIG. 6 is a diagram illustrating types of the NAL unit. The types of the NAL unit are identified by nal_unit_type in a NAL unit header. The types of the NAL unit are classified into a VCL (Video Coding Layer) class and a non-VCL class. The VCL class is a class corresponding to an encoded bit stream of a slice including an encoding target CTU (Coding Tree Unit). The VCL class is a class corresponding to control information required for decoding, such as a VPS (Video Parameter Set), an SPS (Sequence Parameter Set), a PPS (Picture Parameter Set) and an APS (Adaptation Parameter Set). The VPS, the SPS, the PPS and the APS are signaled by different NAL units respectively.

Figure 7:
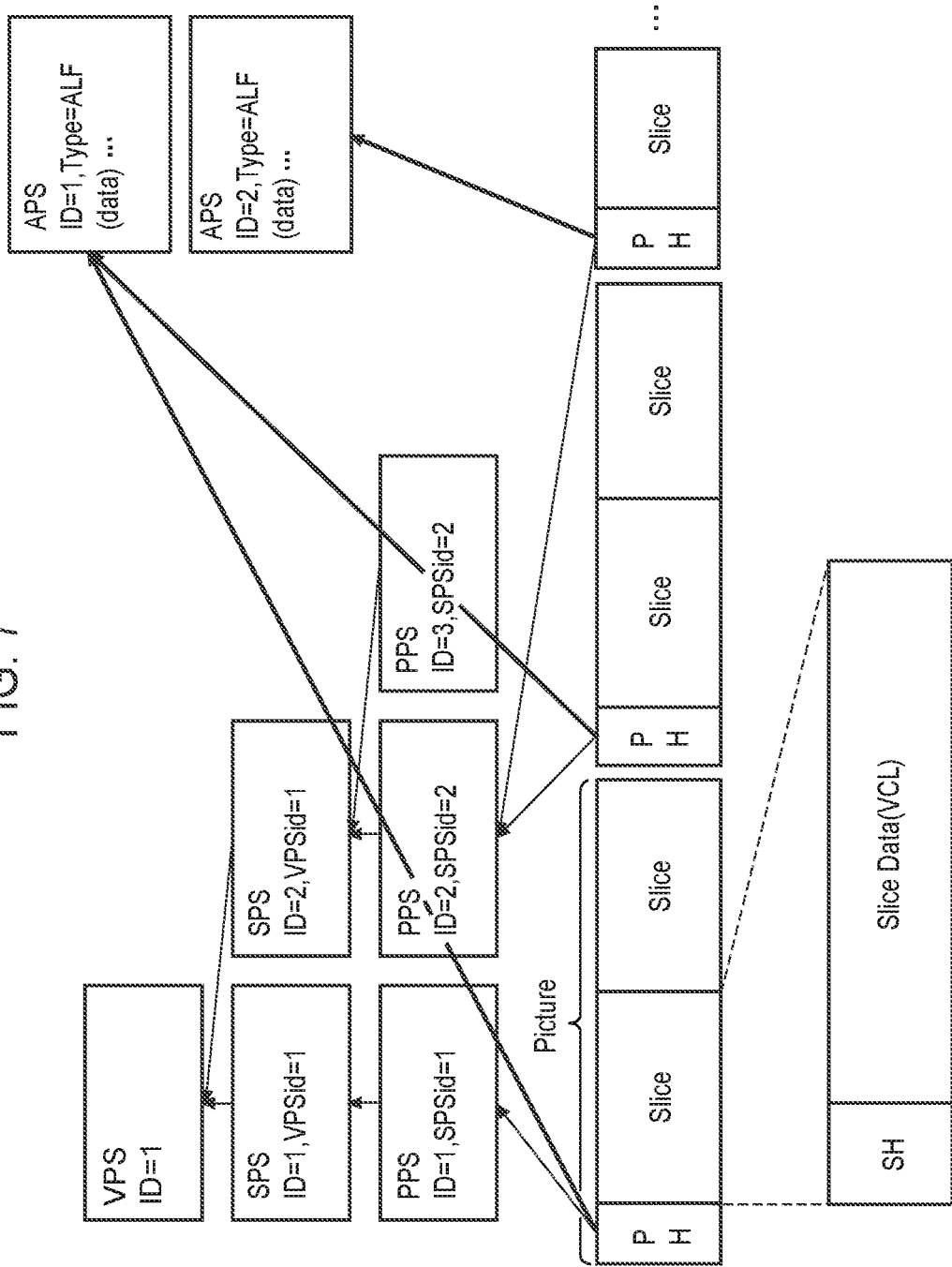
FIG. 7 is a diagram illustrating relations among VPS, SPS, PPS, and APS.

FIG. 7 is a diagram illustrating relations among VPS, SPS, PPS, and APS.

As illustrated in FIG. 7, the VPS has its own ID (vps_video_parameter_set_id) and is referred to from the SPS. The VPS stores information regarding the entire decoding of the bit stream. For example, the VPS includes information of a maximum number of layers and a DPB (Decoded Picture Buffer) or the like.

The SPS has its own ID (sps_seq_parameter_set_id) and is referred to from the PPS. In addition, the SPS has an ID (sps_video_parameter_set_id) of the VPS that the SPS itself refers to. The SPS stores information required for decoding a sequence. For example, the SPS includes information of a chroma format, a maximum width/height, a bit depth, subpicture information (a number, start coordinates of each subpicture, a width and a height or the like), ON/OFF control in sequence units of each encoding tool (each function) and/or VUI (Video usability information) or the like. The information of the ON/OFF control in sequence units includes a flag (sps_scaling_list_enebled_flag) indicating whether or not to apply the scaling list.

PPS has an own ID (pps_pic_parameter_set_id) and is referenced by PH (Picture Header). Moreover, PPS has an ID of SPS (pps_seq_parameter_set_id) that the PPS references. PPS stores information necessary to decode a picture. For example, PPS includes information such as a width and a height of the picture, tile partition information (the numbers of tiles in vertical and horizontal directions, definition of a width, a height, and the like of each row and each column), and/or slice partition information (slice shape after partitioning (rect/non-rect); in case of rect, the number of tiles in width and height directions in each rect).

The PH is header information for each picture. The slice in the picture refers to the PH. The slice can implicitly discriminate the picture including itself so that it is not required to define an ID of the PH. On the other hand, the PH holds an ID (ph_pic_parameter_set_id) of the PPS that is a referent. The PH stores control information for the picture. For example, PH includes information on on/off control of each encoding tool (each function) for the picture. PH includes information indicating that application of each of tools, ALF, LMCS, and scaling list, is enabled or disabled. The information on the on/off control on a picture basis includes a flag (ph_scaling_list_present_flag) indicating whether or not a scaling list is applied. When one or more tools are applied, PH includes an ID of APS that stores parameter information on the one or more tools.

APS is a syntax structure for parameter transmission, for an encoding tool that needs to transmit relatively many parameters, such as ALF, LMCS, and scaling list. APS has an own ID, and the ID is referenced by PH.

By signaling control information (control flag) according to the embodiment and the modification in an SPS, the quantization process can be controlled with one control flag even if a plurality of scaling lists are specified, and an amount of flag information can therefore be reduced. On the other hand, by signaling control information (control flag) according to the embodiment and the modification in an APS, it can be determined, for each of a plurality of set scaling lists, whether or not the applied scaling list is controlled depending on application of color space transformation, and the more flexible quantization process can therefore be achieved.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The encoding device 1 may be embodied as a semiconductor integrated circuit (chipset, SoC, etc.) by integrating the circuits that execute the respective operations of the encoding device 1. The decoding device 2 may be embodied as a semiconductor integrated circuit (chipset, SoC, etc.) by integrating the circuits that execute the respective operations of the decoding device 2.

The embodiments have been described in detail above with reference to the drawings. Specific configurations are not limited to the above-described configurations, and various design changes, and the like are possible within the scope not deviating from the gist.

The invention claimed is:

1. An encoding device that encodes each encoding-target block generated by dividing an image that includes three or more components including a first component, a second component, and a third component, the encoding device comprising:
   a predictor configured to generate, for each of the components, a prediction block corresponding to the encoding-target block;
   a residual generator configured to generate, for each of the components, a prediction residual that represents a difference between the encoding-target block and the prediction block;
   a color space transformer configured to perform a color space transform process on the prediction residual of each of the components;
   a transformer configured to generate transform coefficients by performing a transform process on the prediction residual;
   a quantization controller configured to determine a scaling list to be used in a quantization process on the transform coefficients; and
   a quantizer configured to perform the quantization process on the transform coefficients by using the determined scaling list, wherein
   in a case where the encoding device sets to use a variable scaling list in which at least partially different values can be set as values of elements of the scaling list, the quantization controller is configured to determine whether the variable scaling list is used or a uniform scaling list in which the elements have equal values is used, based on whether or not the color space transformer performs the color space transform process.

2. The encoding device according to claim 1, wherein in the case where the encoding device sets to use the variable scaling list, the quantization controller is configured to:
   determine the variable scaling list as the scaling list when the color space transformer does not perform the color space transform process; and
   determine the uniform scaling list as the scaling list when the color space transformer performs the color space transform process.

3. The encoding device according to claim 1, wherein in a case where the encoding device sets to use a variable scaling list in which at least partially different values can be set as values of elements of the scaling list, the quantization controller is configured to change correspondences between the three or more components and scaling lists for the individual components, based on whether or not the color space transformer performs the color space transform process.

4. The encoding device according to claim 3, wherein in the case where the encoding device sets to use the variable scaling list, the quantization controller is configured to:
   determine a first scaling list for an R component that is the first component, a second scaling list for a G component that is the second component, and a third scaling list for a B component that is the third component when the color space transformer does not perform the color space transform process; and
   determine the second scaling list for a Y component that is the first component when the color space transformer performs the color space transform process.

5. The encoding device according to claim 1, further including an entropy encoder, wherein
   the entropy encoder is configured to output a sequence parameter set or an adaptation parameter set including information indicating whether or not operation of determining the scaling list based on the color space transform process is performed.

6. A decoding device that decodes each decoding-target block generated by dividing an image that includes three or more components including a first component, a second component, and a third component, the decoding device comprising:
   an entropy decoder configured to decode, for each of the components, quantized transform coefficients in the decoding-target block from a bit stream;
   a predictor configured to generate, for each of the components, a prediction block corresponding to the decoding-target block;
   an inverse quantization controller configured to determine a scaling list to be used in an inverse quantization process;
   an inverse quantizer configured to generate transform coefficients by performing the inverse quantization process on the quantized transform coefficients by using the determined scaling list, an inverse transformer configured to generate a prediction residual by performing an inverse transform process on the transform coefficients;
a color space inverse transformer configured to perform a color space inverse transform process on the prediction residual; and
a combiner configured to generate a decoded block by combining the prediction residual and the prediction block, wherein
in a case where an encoding side sets to use a variable scaling list in which at least partially different values can be set as values of elements of the scaling list, the inverse quantization controller is configured to determine whether the variable scaling list is used or a uniform scaling list in which the elements have equal values is used, based on whether or not the color space inverse transformer performs the color space inverse transform process.

7. The decoding device according to claim 6, wherein in the case where the encoding side sets to use the variable scaling list, the inverse quantization controller is configured to:
determine the variable scaling list as the scaling list when the color space inverse transformer does not perform the color space inverse transform process; and
determine the uniform scaling list as the scaling list when the color space inverse transformer performs the color space inverse transform process.

8. The decoding device according to claim 6, wherein in a case where an encoding side sets to use a variable scaling list in which at least partially different values can be set as values of elements of the scaling list, the inverse quantization controller is configured to change correspondences between the three or more components and scaling lists for the individual components, based on whether or not the color space inverse transformer performs the color space inverse transform process.

9. The decoding device according to claim 8, wherein in the case where the encoding side sets to use the variable scaling list, the inverse quantization controller is configured to
determine a first scaling list for an R component that is the first component, a second scaling list for a G component that is the second component, and a third scaling list for a B component that is the third component when the color space inverse transformer does not perform the color space inverse transform process, and
determine the second scaling list for a Y component that is the first component when the color space inverse transformer performs the color space inverse transform process.

10. The decoding device according to claim 6, wherein the entropy decoder is configured to acquire a sequence parameter set or an adaptation parameter set including information indicating whether or not operation of determining the scaling list based on the color space inverse transform process is performed.

11. A non-transitory computer-readable recording medium storing a program causing a computer to function as the encoding device according to claim 1.

12. A non-transitory computer-readable recording medium storing a program causing a computer to function as the decoding device according to claim 6.

* * * * *